(12) United States Patent
Kawasaki et al.

(10) Patent No.: US 8,910,735 B2
(45) Date of Patent: Dec. 16, 2014

(54) ELECTRIC VEHICLE

(71) Applicant: Honda Motor Co., Ltd., Tokyo (JP)

(72) Inventors: Yohei Kawasaki, Wako (JP); Masaru Odajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/851,129

(22) Filed: Mar. 27, 2013

(65) Prior Publication Data

US 2013/0284528 A1 Oct. 31, 2013

(30) Foreign Application Priority Data

Mar. 30, 2012 (JP) .................................. 2012-080826

(51) Int. Cl.
*B60K 7/00* (2006.01)
*B60G 3/20* (2006.01)

(52) U.S. Cl.
CPC ................ *B60K 7/0007* (2013.01); *B60G 3/20* (2013.01)
USPC ......................... 180/65.51; 180/65.6; 301/6.5

(58) Field of Classification Search
CPC ...... B60K 7/00; B60K 7/0007; B60K 17/043; B60K 17/046
USPC .................... 180/65.51, 65.6, 65.7, 291, 292; 903/951, 952; 301/6.1, 6.5
See application file for complete search history.

(56) References Cited

U.S. PATENT DOCUMENTS

| 7,621,357 B2 * | 11/2009 | Suzuki et al. ................. 180/65.1 |
| 7,641,010 B2 * | 1/2010 | Mizutani et al. ........... 180/65.51 |
| 8,157,036 B2 * | 4/2012 | Yogo et al. ................. 180/65.51 |

FOREIGN PATENT DOCUMENTS

JP 2006-248417 9/2006

* cited by examiner

*Primary Examiner* — John Walters
(74) *Attorney, Agent, or Firm* — Squire Patton Boggs (US) LLP

(57) ABSTRACT

In an electric vehicle, a bearing supporting portion supporting another end of a motor shaft is provided in a reducer case and protrudes to a recessed portion while extending at a lateral side of the knuckle. The reducer case being part of a drive unit is partially housed in the recessed portion of a wheel. The drive unit can be located closer to a rear wheel by an amount corresponding to the housed portion. Accordingly, it is possible to dispose part of the drive unit inside the wheel and thereby suppress protruding of the drive unit to a small degree.

18 Claims, 12 Drawing Sheets

ELECTRIC VEHICLE

BACKGROUND

1. Field

The present invention relates to improvements of an electric vehicle in which left and right drive wheels are driven respectively by electric drive units.

2. Description of Related Art

Electric vehicles which can easily achieve energy saving and reduction in environmental load are attracting attention and are being put to practical use. As a result of improvements in performance of electric motors, there has been proposed a drive method in which one electric motor drives one drive wheel, as described, for example, in FIG. 1 of Patent Document 1 (Japanese Patent Application Publication No. 2006-248417).

Note that an electric motor, a hydraulic motor, and a pneumatic motor are collectively referred to as motors. When there is a need to specify the type of the motor, a term of electric motor is used.

As shown in FIG. 1 of Patent Document 1, a drive wheel (10) (the number in parentheses indicates reference numeral described in Patent Document 1. The same shall apply hereinafter) is driven by an in-wheel motor (20). The in-wheel motor (20) is an electric motor unit with a reducer in which a gear reducer is integrated with an electric motor, and is disposed in a bowl-shaped recessed portion of a wheel (13). Moreover, the drive wheel (10) is suspended from a vehicle body frame via a suspension device and moves vertically relative to the vehicle body frame. This secures ride quality.

The output is sometimes increased due to demand for high-speed travelling of the vehicle and further increase in performance of the vehicle. The output can be easily increased by increasing the size of the in-wheel motor (20).

However, the in-wheel motor (20) with an increased size cannot be fully housed in the bowl-shaped recessed portion of the wheel (13) and most of the in-wheel motor (20) protrudes from the bowl-shaped recessed portion to a vehicle body center side.

This protrusion largely affects the design of the wheel suspension device and leads to increase in design cost.

In view of this, there is a demand for an efficient suspension device and an optimum arrangement of the electric motor in a case where the electric motor cannot be disposed in the recessed portion of the wheel.

SUMMARY

An object of the present invention is to provide an efficient suspension device and a technique for an optimal arrangement of an electric motor in a case where the electric motor cannot be disposed in a recessed portion of a wheel.

A first embodiment of the invention is an electric vehicle which includes left and right drive wheels and in which a brake device is provided in a recessed portion of a wheel of each of the drive wheels and the wheel of each of the drive wheels is driven by a drive unit. A vertically-swingable upper arm and a vertically-swingable lower arm extend from a vehicle body frame of the electric vehicle in a vehicle width direction. A knuckle is connected to a distal end of the upper arm and a distal end of the lower arm. The wheel is rotatably supported by the knuckle, and the drive unit is connected to the knuckle from a vehicle body center side. The drive unit can be a unit in which an electric motor and a reducer are integrated, and the electric motor can be disposed in such a way that a perpendicular line passing through a rotation center of the wheel overlaps a motor shaft in a vehicle side view. An upper arm portion extends obliquely upward toward a rear of the vehicle from the knuckle, and is interposed between the wheel and the drive unit to a position where the upper arm portion does not overlap the drive unit in the vehicle side view, and the upper arm is connected to an upper end of the upper arm portion.

A second embodiment of the invention can include the drive unit being formed by attaching the electric motor to one surface of a center case and by attaching the reducer to another surface of the center case. The electric motor can include a bottomed-tube-shaped motor case fastened to the center case, and a stator attached to the motor case. The motor shaft can be rotatably supported at one end by the motor case and rotatably supported at another end by the reducer case. A rotor can be attached to the motor shaft and surrounded by the stator. The center case can have a through hole through which the motor shaft penetrates. The reducer can include the bottomed-tube-shaped reducer case fastened to the center case, a drive gear provided at a front end of the motor shaft and housed in the reducer case, a driven gear rotated by the drive gear directly or via an intermediate gear and housed in the reducer case, and an output shaft rotated by the driven gear and configured to rotate the wheel. A bearing supporting portion supporting the other end of the motor shaft is provided in the reducer case and protrudes to the recessed portion of the wheel while extending at a lateral side of the knuckle.

A third embodiment of the invention can be such that the drive unit is disposed inside an outer diameter circle of a tire of each of the drive wheels in a vehicle side view.

A fourth embodiment of the invention is such that a rectangular space surrounded from three sides by the tire, the reducer case, and the center case in a vehicle front view is formed, and a joint portion between the upper arm portion and the upper arm is disposed in the rectangular space.

A fifth embodiment of the invention is such that, in the vehicle side view, an upper half of the motor case has a semicircle shape and at least part of the joint portion is disposed in an almost-triangular space surrounded by the semicircle, a horizontal line passing through the uppermost point of the semicircle, and a vertical line passing through the vehicle rearmost point of the semicircle.

A sixth embodiment of the invention is such that the upper arm is a V-shaped member having an intermediate portion protruding upward and the vehicle body frame side connection portion of the upper arm is below the joint portion.

A seventh embodiment of the invention is such that a terminal portion is provided in an upper portion of the motor case and a high-voltage wire extending from the terminal portion is routed along an outer peripheral surface of the motor case.

An eighth embodiment of the invention is such that the terminal portion includes three terminal portions of U, V, and W. The three terminal portions can be arranged along the outer peripheral surface of the motor case at certain intervals; the high-voltage wire is lead out toward the rear of the vehicle, the terminal portion on a vehicle rear side in a vehicle plan view is disposed to be offset toward a vehicle body center with respect to the terminal portion in the middle, and the terminal portion on a vehicle front side is disposed to be offset toward the wheel with respect to the terminal portion in the middle.

A ninth embodiment of the invention is such that a cover covering and holding down the high-voltage wire is provided in a portion of the motor case where the high-voltage wire intersects the upper arm.

According to the first embodiment of the invention, the electric motor which does not fit into the recessed portion of the wheel is disposed beside the tire (on a vehicle width center side), above the rotation center of the wheel. This enables the upper arm portion to extend beside the tire, outside the recessed portion of the wheel, and to be connected to the upper arm in a space behind (on a vehicle rear side of) the electric motor. Although the electric motor protrudes in the vehicle width direction, the upper arm avoids the electric motor due to the shape thereof. Accordingly, the electric motor can be avoided from protruding beyond the length of the upper arm. Moreover, the upper arm portion can only extend over the shortest length to a connection portion with the upper arm.

In other words, embodiments of the present invention can provide a technique for an optimum arrangement of an electric motor which does not affect the suspension device and suppresses the protruding in vehicle width direction even when the electric motor cannot be disposed in the recessed portion of the wheel.

According to the second embodiment of the invention, the bearing supporting portion supporting the other end of the motor shaft is provided in the reducer case and protrudes to the recessed portion of the wheel while extending at the lateral side of the knuckle. The reducer case which is part of the drive unit is thus partially housed in the recessed portion of the wheel. Accordingly, the drive unit can be disposed closer to the drive wheel by an amount corresponding to the housed portion. Particularly, the vehicle width direction width of the vehicle body frame can be secured even in a vehicle having a small width.

In other words, according to embodiments of the present invention, it is possible to dispose part of the drive unit in the wheel and thereby suppress the protruding of the drive unit to a small degree.

According to the third embodiment of the invention, the drive unit is disposed inside the outer diameter circle of the tire of each of the drive wheels in the vehicle side view.

Since the drive unit cannot be seen in the vehicle side view, appearance is improved. Moreover, since the tire serves as a protection material of the drive unit, a protection cover of the drive unit can be omitted.

According to the fourth embodiment of the invention, the joint portion between the upper arm portion and the upper arm are disposed in the rectangular space surrounded from three sides by the tire, the reducer case, and the center case in the vehicle front view.

Since the joint portion is disposed in the rectangular space, connection work and separation work of the joint portion can be performed easily by using the rectangular space as a work space. Accordingly, the work time can be reduced.

According to the fifth embodiment of the invention, in the vehicle side view, the upper half of the motor case has a semicircle shape and at least part of the joint portion is disposed in the almost-triangular space surrounded by the semicircle, the horizontal line passing through the uppermost point of the semicircle, and the vertical line passing through the vehicle rearmost point of the semicircle.

By disposing the joint portion in the almost-triangular space formed in a corner above the semicircle shape, the joint portion can be disposed close to the motor case while avoiding interference with the motor case.

According to the sixth embodiment of the invention, the upper arm is a V-shaped member having the intermediate portion protruding upward and the vehicle body frame side connection portion of the upper arm is below the joint portion.

Forming the upper arm in a so-called "inverted-V shape" allows the upper arm to avoid the motor case and the drive unit to fit within the length of the upper arm. As a result, more room is provided for the motor case and freedom in design of the motor case and the like is improved.

According to the seventh embodiment of the invention, the terminal portions are provided in the upper portion of the motor case and the high-voltage wires extending from the terminal portions are routed along the outer peripheral surface of the motor case.

The high-voltage wires are thicker and stiffer than low-voltage wires. In view of this, the high-voltage wires can be made to gently curve by routing the high-voltage wires along the semicircular motor case.

The motor case vertically swings relative to the vehicle body together with the drive wheel. The swinging can be absorbed by making the high-voltage wires gently curve.

According to the eighth embodiment of the invention, the terminal portions are the three terminal portions of U, V, and W, the three terminal portions are arranged along the outer peripheral surface of the motor case at certain intervals, and the high-voltage wires are lead out toward the rear of the vehicle. Moreover, the terminal portion on the vehicle rear side in the vehicle plan view is disposed to be offset toward the vehicle body center with respect to the terminal portion in the middle, and the terminal portion on the vehicle front side is disposed to be offset toward the wheel with respect to the terminal portion in the middle.

In other words, the three terminal portions are arranged stepwise. Since the terminal portions are arranged stepwise, end portions of the high-voltage wires can be fastened to the terminal portions in straight shapes, without being bent. Connection work to the terminals is thereby made easy.

According to the ninth embodiment of the invention, the cover covering and holding down the high-voltage wires is provided in the portion of the motor case where the high-voltage wires intersect the upper arm.

The high-voltage wires can be fastened to the motor case by the cover. In addition, since the high-voltage wires are protected by the cover, the positioning accuracy of the high-voltage wires is improved. Accordingly, positional relationships of the high-voltage wires with other parts (the upper arm, for example) can be accurately determined.

DETAILED DESCRIPTION

Figure 1:
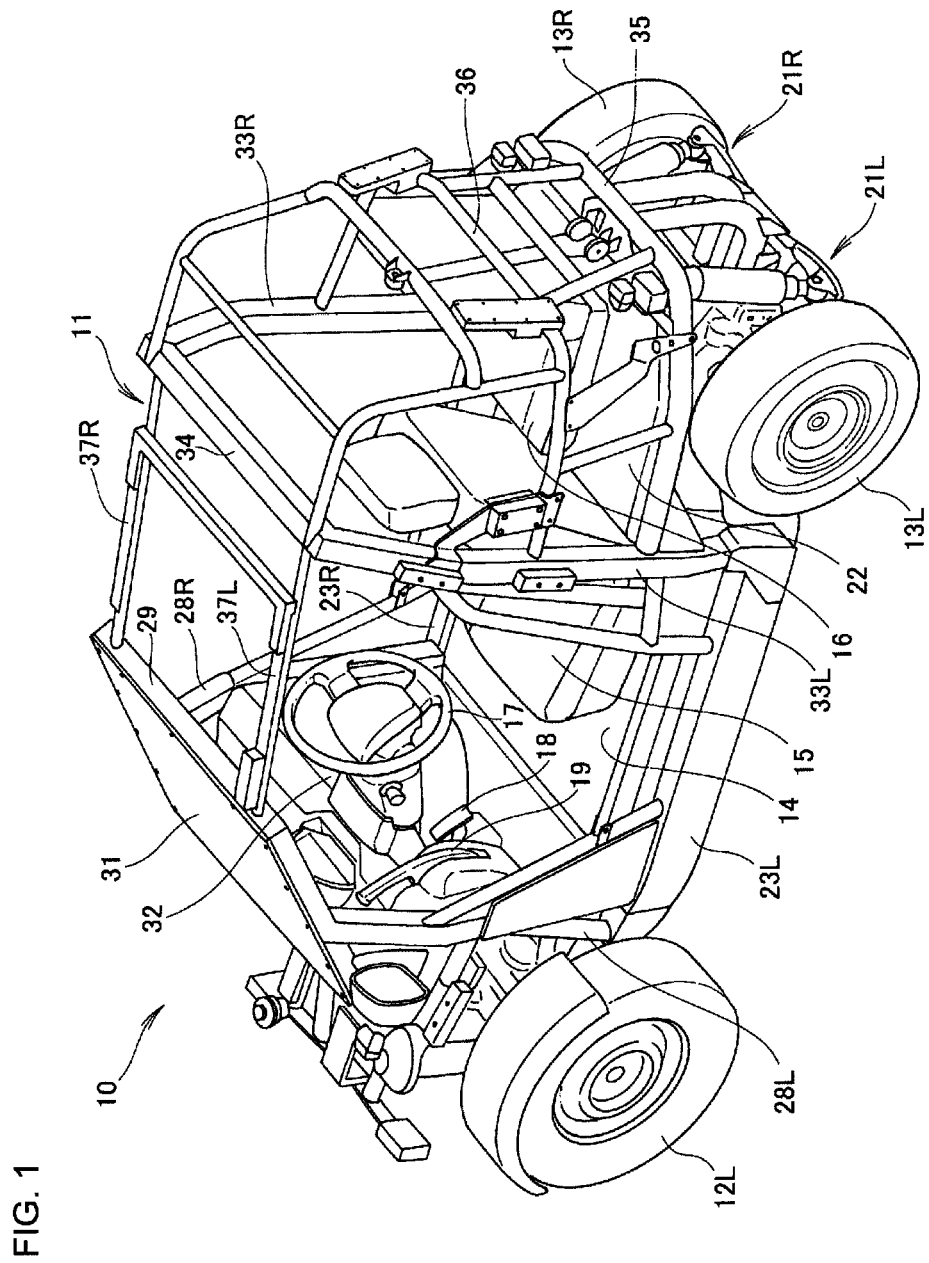
FIG. 1 is a perspective view of an electric vehicle according to an embodiment of the present invention.

An embodiment of the present invention is described below based on the accompanying drawings. Note that the drawings are to be seen in a direction in which the reference numerals can be read properly. Moreover, front, rear, left, and right are based on a position of a driver.

As shown in FIG. 1, an electric vehicle 10 is in this example a narrow vehicle as follows. A vehicle body frame 11 is provided with a front wheel 12L (L is a suffix indicating left) and rear wheels 13L, 13R (R is a suffix indicating right). A driver seat 15 is provided on a floor 14. A passenger seat 16 is provided behind the driver seat 15. A steering wheel 17, a brake pedal 18, and a parking brake lever 19 are provided in front of the driver seat 15. Although not illustrated in FIG. 1, a right front wheel exists. In other words, the electric vehicle 10 is a narrow four-wheel vehicle.

The passenger seat 16 is disposed between the left and right rear wheels 13L, 13R and between suspension devices 21L, 21R. The passenger seat 16 may be replaced with a rear cargo bed. Alternatively, the passenger seat 16 may be detachably attached onto a rear cargo bed 22.

Figure 10:
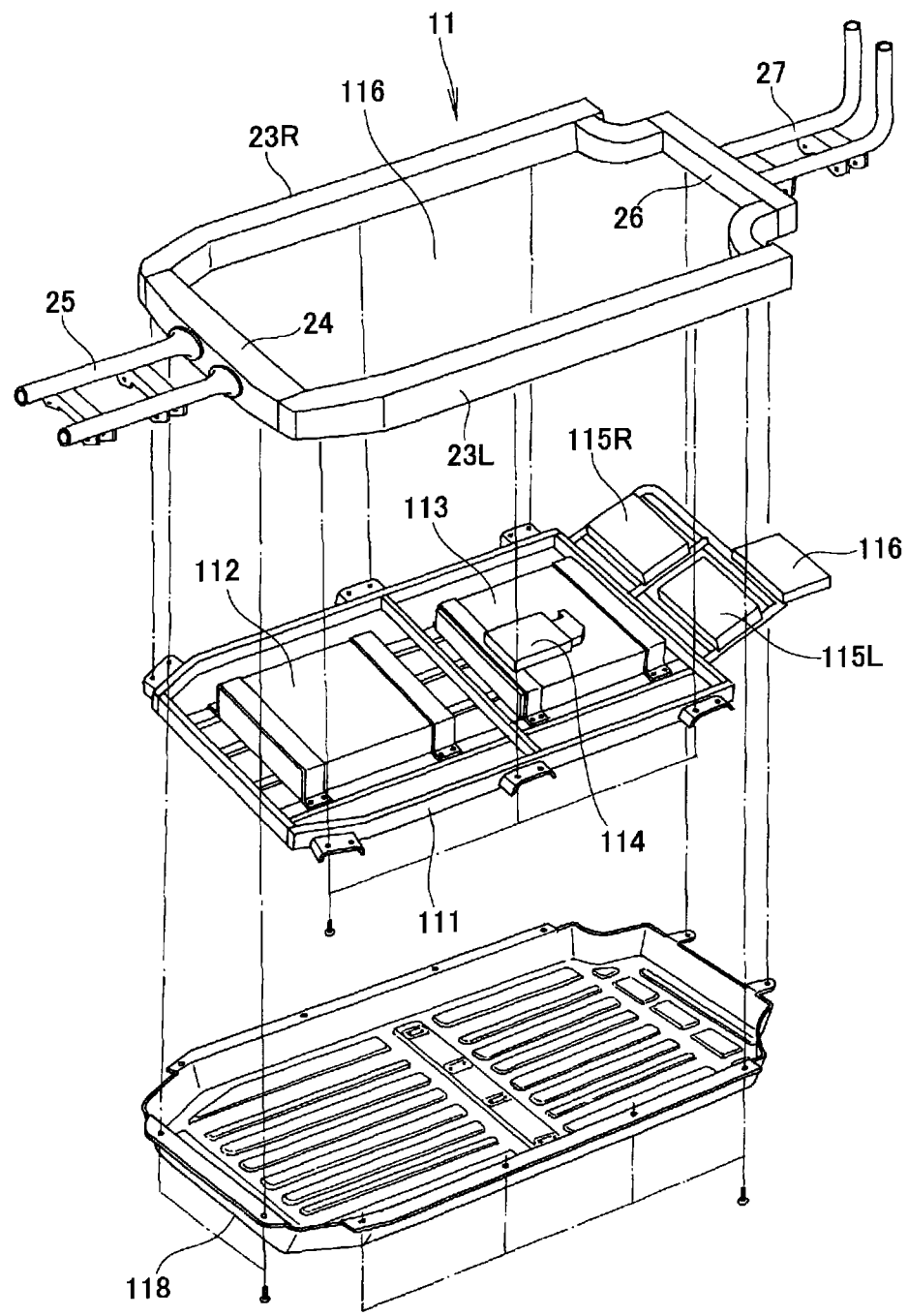
FIG. 10 is an exploded view of a vehicle floor.

The vehicle body frame 11 has, as main elements, left and right side sills 23L, 23R as well as a front cross frame 24, a front subframe 25 extending toward the front of the vehicle from the front cross frame 24, a rear cross frame 26, and a rear portion subframe 27 extending toward the rear of the vehicle from the rear cross frame 26 which are shown in FIG. 10.

Furthermore, as shown in FIG. 1, front upper frames 28L, 28R extend upward respectively from front end portions of the side sills 23L, 23R and a cross sub-member 29 is laid between upper ends of the front upper frames 28L, 28R. A front shield 31 is attached to the front upper frames 28L, 28R and the cross sub-member 29 from the front.

An instrument panel 32 is laid between the left and right front upper frames 28L, 28R. The steering wheel 17 is disposed slightly to the left of the vehicle width center of the instrument panel 32 and the parking brake lever 19 is disposed to the left of the steering wheel 17.

Moreover, rear upper frames 33L, 33R extend upward respectively from rear end portions of the side sills 23L, 23R and a cross sub-member 34 is laid between upper ends of the rear upper frames 33L, 33R. Furthermore, a square-U shaped rear subframe 35 extends from the rear upper frames 33L, 33R at a position above the rear wheels 13L, 13R to surround the passenger seat 16 from left, right, and rear. A cage-shaped cage frame 36 extends from the rear upper frames 33L, 33R and the cross sub-member 34 to surround the passenger seat 16 at a position above the rear subframe 35. Longitudinal members 37L, 37R are laid between the front cross sub-member 29 and the rear cross sub-member 34 and a vehicle cabin is thus formed.

Figure 2:
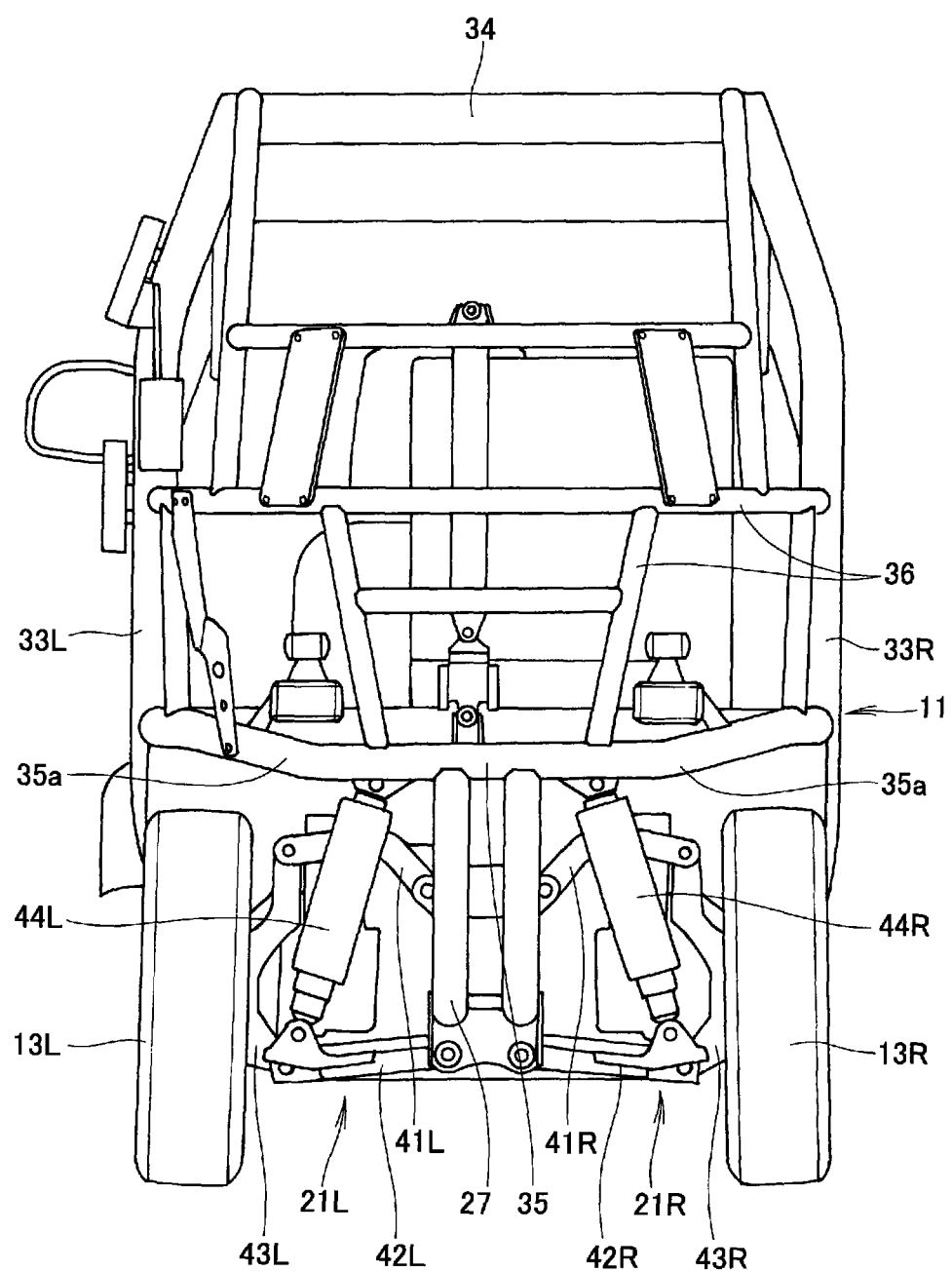
FIG. 2 is a rear view of the electric vehicle according to an embodiment of the present invention.

As shown in FIG. 2, the rear wheels 13L, 13R which are left and right drive wheels are supported by the suspension devices 21L, 21R to be vertically swingable on the vehicle body frame 11. Rear wheels 13L, 13R are each inclined in such a way that an upper end thereof is closer to the vehicle width center than a lower end thereof is.

The rear subframe 35 extending in a vehicle width direction is bent upward in portions over the rear wheels 13L, 13R. Providing bent portions 35a, 35b can secure spaces for upward swing of the rear wheels 13L, 13R.

The left suspension device 21L includes an upper arm 41L and a lower arm 42L which extend to the left from the vehicle body frame 11 in the vehicle width direction, a knuckle 43L which is connected to distal ends of the arms 41L, 42L, and a rear cushion 44L which is laid between the end of the lower arm 42L and the vehicle body frame 11 and buffers vertical movements of the rear wheels 13L, 13R.

In the right suspension device 21R, the suffixes of the reference numerals are changed from L to R and detailed description of the right suspension device 21R is omitted.

Figure 3:
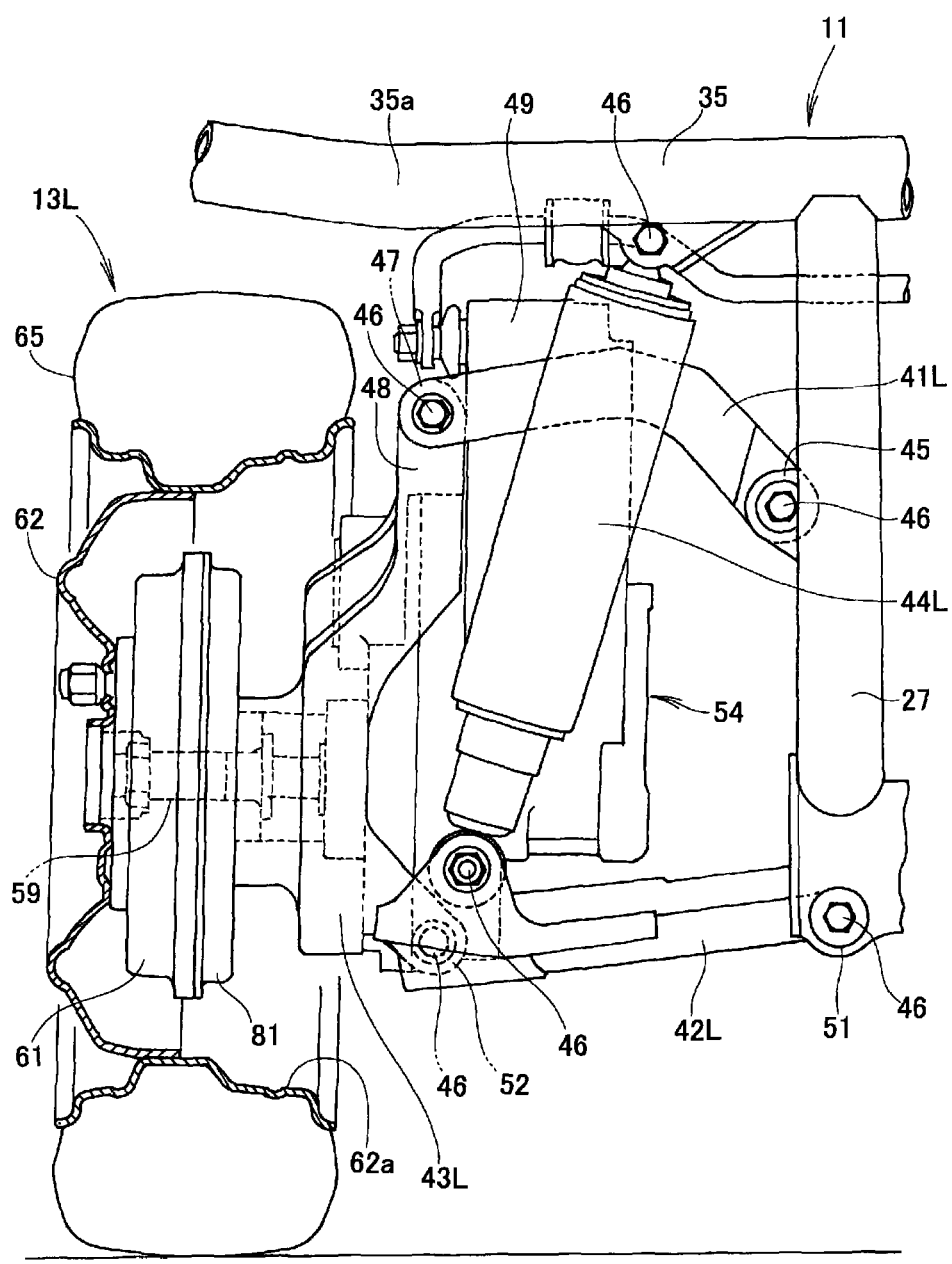
FIG. 3 is an enlarged view of a main portion of FIG. 2.

As shown in FIG. 3, the upper arm 41L is connected to the vehicle body frame 11 (specifically, the rear portion subframe 27) at a vehicle body frame side connection portion 45 with a connector 46. A bolt formed by providing a bolt head and a female screw on a pin extending in a near-far direction of the drawing is preferable as the connector 46.

The distal end of the upper arm 41L is connected to an upper arm portion 48 of the knuckle 43L at a joint portion 47 with the connector 46.

The upper arm 41L is a V-shaped member having an intermediate portion (center portion in the vehicle width direction) protruding upward. The vehicle body frame side connection portion 45 is below the joint portion 47.

A motor case 49 is disposed on the far side (vehicle front side) of the upper arm 41L in the drawing. Forming the upper arm 41L in a so-called "inverted-V shape" allows the upper arm 41L to avoid the motor case 49.

The lower arm 42L is also connected to a lower portion of the vehicle body frame 11 (specifically, the rear portion subframe 27) at a lower vehicle body frame side connection portion 51 with the connector 46 and is connected to a lower portion of the knuckle 43L at a lower joint portion 52 with the connector 46.

The rear cushion 44L is disposed in an oblique vertical direction. An upper portion of the rear cushion 44L is connected to the vehicle body frame 11 (specifically, the rear subframe 35) with the connector 46 while the lower portion thereof is connected to the lower arm 42L with the connector 46.

The rear wheel 13L and a drive unit 54 are attached to the knuckle 43L in such a way that the knuckle 43L is interposed between the rear wheel 13L and the drive unit 54 (details will be described in FIG. 4). The drive unit 54 serves the role of driving the rear wheel 13L.

Figure 4:
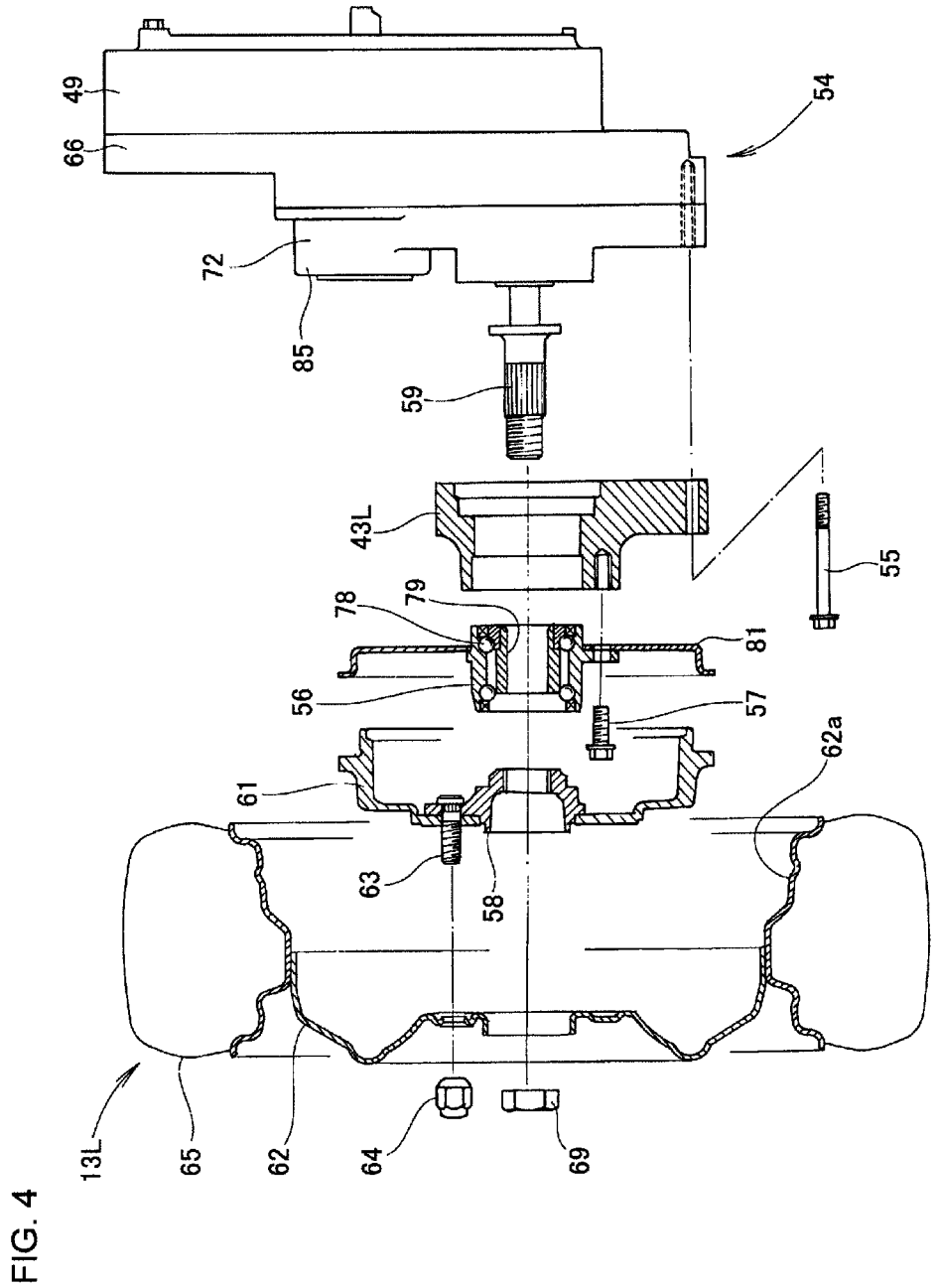
FIG. 4 is an exploded view around a rear wheel.

As shown in FIG. 4, the drive unit 54 is fixed to a surface of the knuckle 43L on the vehicle body center side with a bolt 55. Moreover, a bearing case 56 is fixed to a surface of the knuckle 43L on a vehicle outer side (side of wheel 62) with a bolt 57. A wheel supporting member 58 is disposed on the vehicle outer side of the bearing case 56. The wheel supporting member 58 is spline-coupled to an output shaft 59 extending from the drive unit 54 and is rotated by the output shaft 59.

A brake drum 61 and a wheel 62 of the rear wheel 13L are fastened together to the wheel supporting member 58 with a bolt 63 and a nut 64. The rear wheel 13L and the drive unit 54 are thus attached to the knuckle 43L.

Figure 5:
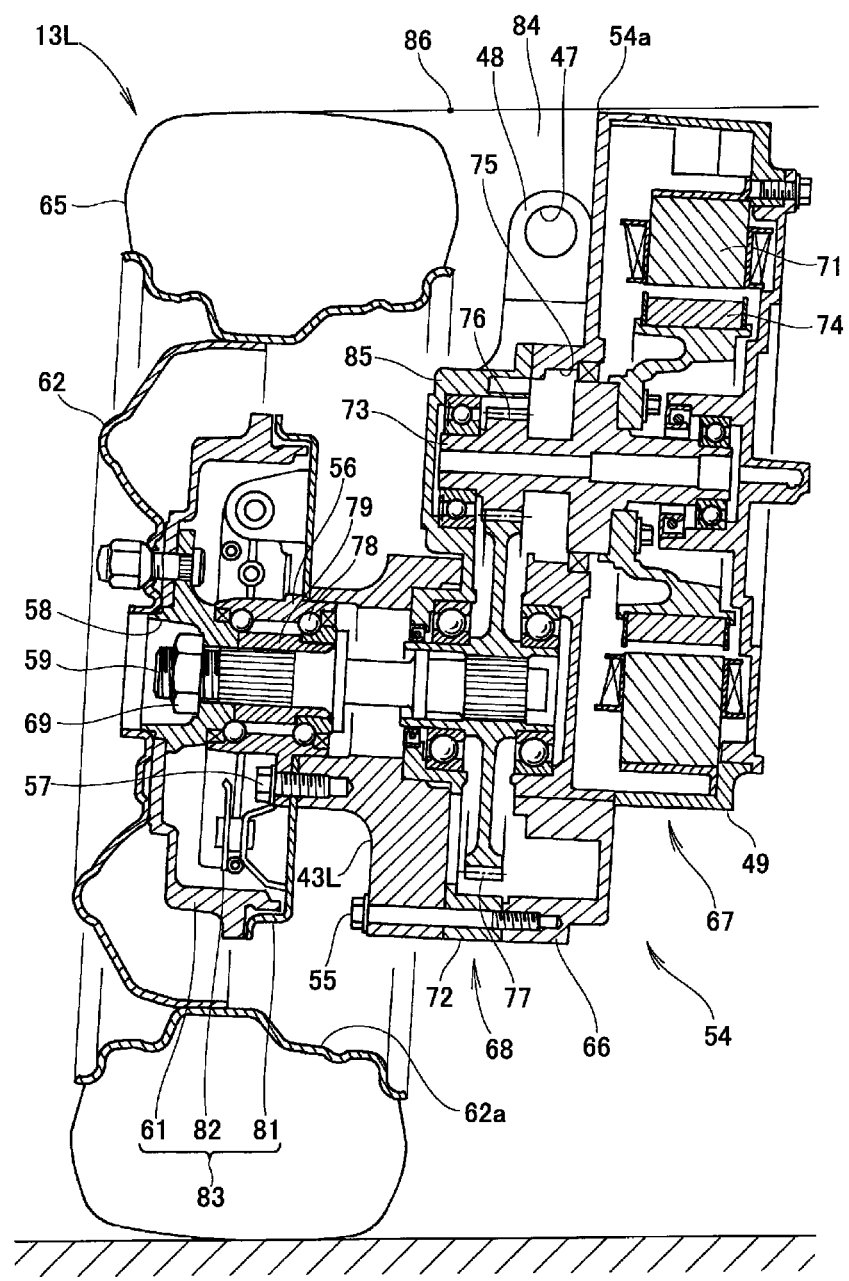
FIG. 5 is a cross-sectional view of the rear wheel and a drive unit.

A form after the attachment is described in detail by using FIG. 5.

As shown in FIG. 5, the rear wheel 13L includes the wheel 62 which has a bowl-shaped recessed portion 62a and a tire 65 which is mounted on the wheel 62.

Moreover, the drive unit 54 is formed by attaching an electric motor 67 on one surface of a center case 66 and by attaching a reducer 68 on the other surface of the center case 66.

The electric motor 67 includes the bottomed-tube-shaped motor case 49 fastened to the center case 66, a stator 71 attached to the motor case 49, a motor shaft 73 rotatably supported at one end by the motor case 49 and rotatably supported at the other end by a reducer case 72, and a rotor 74 attached to the motor shaft 73 and surrounded by the stator 71.

The center case 66 is a vertically-long member and has a through hole 75 through which the motor shaft 73 penetrates.

The reducer 68 includes the bottomed-tube-shaped reducer case 72 fastened to the center case 66, a small-diameter drive gear 76 provided at a front end of the motor shaft 73 and housed in the reducer case 72, a large-diameter driven gear 77 rotated by the drive gear 76 directly or via an intermediate gear and housed in the reducer case 72, and the output shaft 59 rotated by the driven gear 77 and configured to rotate the wheel 62.

An inner race 79 is provided inside the bearing case 56 with rolling elements 78 therebetween, and the output shaft 59 is spline-coupled to the inner race 79. Specifically, a front end of the output shaft 59 is rotatably supported by the bearing case 56 and displacement (deflection) in a radial direction is thereby prevented.

Moreover, the wheel supporting member 58 is fixed to the front end of the output shaft 59 with a nut 69. The wheel 62 is thereby rotated by the output shaft 59. An upward load acting on the rear wheel 13L is transmitted to the wheel supporting member 58, the output shaft 59, and the inner race 79 in this order. Since the wheel supporting member 58 and the inner race 79 are in contact with each other in an axial direction and a protruding length of the output shaft 59 from the inner race 79 is short, the upward load acting on the rear wheel 13L is supported by the inner race 79 and is then supported by the knuckle 43L via the bearing case 56.

Since almost no bending moment acts on the output shaft 59, the output shaft 59 can be designed exclusively for rotary power transmission. Accordingly, the diameter of the output shaft 59 can be reduced.

A brake base plate 81 is fixed to an outer periphery of the bearing case 56. Brake shoes and a shoe expanding part 82 are attached to the brake base plate 81.

Moreover, the brake drum 61 is fixed to the wheel supporting member 58. Braking of the rear wheel 13L can be performed by causing the brake shoes to slide in contact with an inner peripheral surface of the brake drum 61.

A brake device 83 including the brake drum 61, the brake base plate 81, the brake shoes, and the shoe expanding part 82 which are described above is provided in the recessed portion 62a of the wheel 62.

Moreover, in a rear view (likewise in a vehicle front view), there is formed a rectangular space 84 surrounded from three sides by the tire 65, the reducer case 72, and the center case 66. The joint portion 47 for connecting the upper arm portion 48 and the upper arm 41L to each other is disposed in the rectangular space 84.

Since the joint portion 47 is disposed in the rectangular space 84, connection work and separation work of the joint portion 47 can be performed easily by using the rectangular space 84 as a work space. Accordingly, the work time can be reduced.

Moreover, a bearing supporting portion 85 supporting the other end of the motor shaft 73 is provided in the reducer case 72. The bearing supporting portion 85 protrudes to the recessed portion 62a while extending at a lateral side of the knuckle 43L.

In other words, the reducer case 72, being part of the drive unit 54, is partially housed in the recessed portion 62a of the wheel 62. The drive unit 54 can be located closer to the rear wheel (drive wheel) 13L by an amount corresponding to the housed portion. Accordingly, it is possible to dispose part of the drive unit 54 inside the wheel 62, and to thereby suppress protruding of the drive unit 54 to a small degree.

As described in FIG. 2, the rear wheels 13L, 13R are each inclined in such a way that the upper end thereof is located closer to the vehicle width center. Accordingly, as shown in FIG. 5, an uppermost point 54a of the drive unit 54 is below a horizontal line 86 passing through an upper end of the tire 65.

Figure 6:
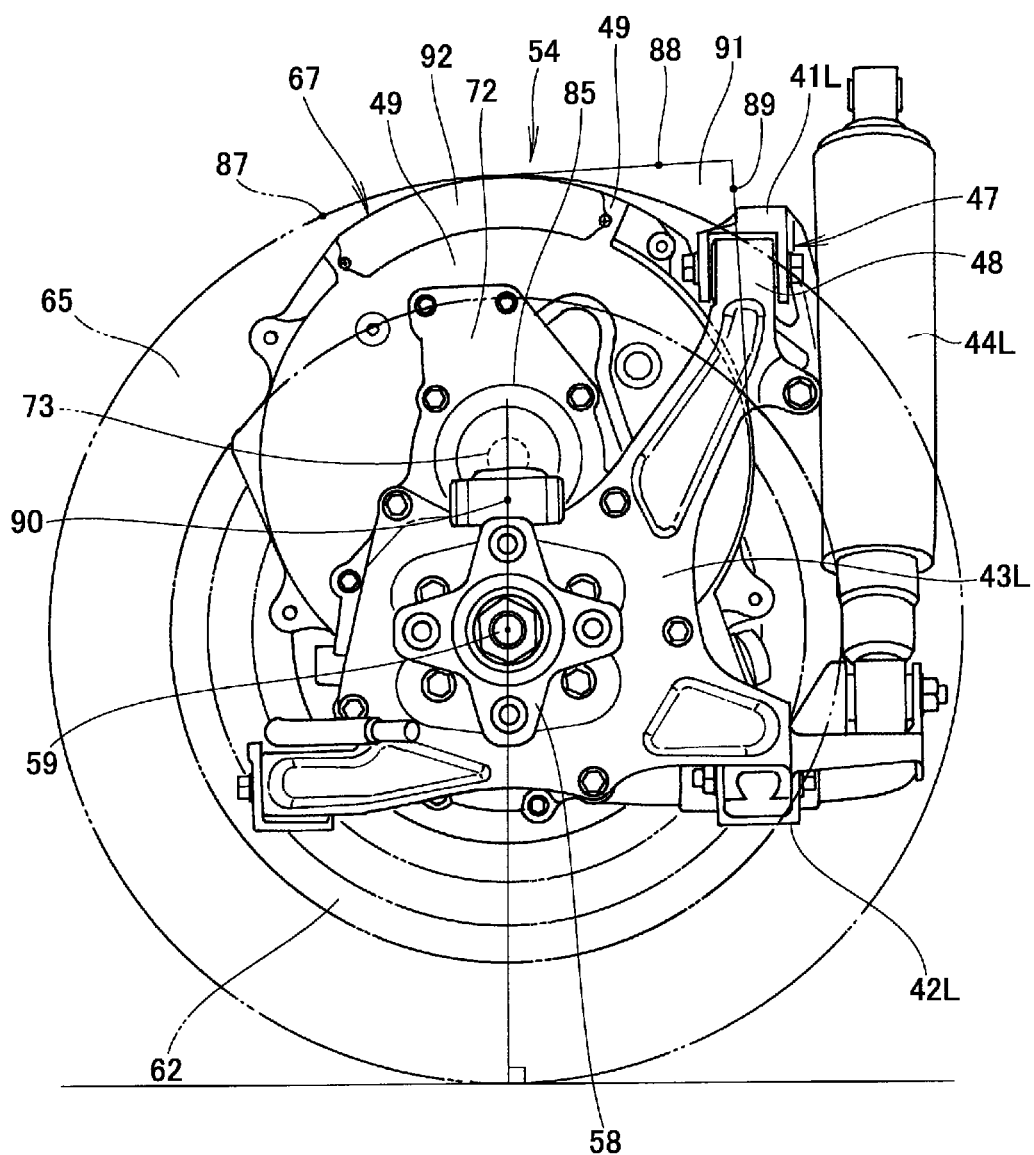
FIG. 6 is a left side view of a suspension device.

As shown in FIG. 6, the drive unit 54 is thus disposed inside an outer diameter circle 87 of the tire 65 which is shown by an imaginary line. Since the drive unit 54 cannot be seen in a vehicle side view, appearance is improved. Moreover, since the tire 65 serves as a protection material of the drive unit 54, a protection cover of the drive unit 54 can be omitted.

Furthermore, as shown in FIG. 6, the electric motor 67 is disposed in such a way that a perpendicular line 90 passing through the rotation center of the wheel 62 (center of the output shaft 59) and extending upward overlaps the motor shaft 73.

The upper arm portion 48 is extended obliquely upward toward the rear of the vehicle from the knuckle 43L to a position where the upper arm portion 48 does not overlap the drive unit 54, and the upper arm 41L is connected to the upper end of the upper arm portion 48. Modifying the arrangement of the upper arm portion 48 eliminates the interference of the drive unit 54 with the upper arm 41L. As a result, the electric motor 67 can be disposed in a form extending upward. Even when the electric motor 67 is too large to be disposed in the recessed portion 62a of the wheel 62, the electric motor 67 can be easily disposed behind the rear wheel 13L while avoiding interference with the upper arm portion 48 and the upper arm 41.

Moreover, as shown in FIG. 6, in the vehicle side view, an upper half of the motor case 49 has a semicircle shape, and at least part of the joint portion 47 is disposed in an almost-triangular space 91 surrounded by the semicircle (motor case 49), a horizontal line 88 passing through the uppermost point of the semicircle (motor case 49), and a vertical line 89 passing through the vehicle rearmost point of the semicircle (motor case 49).

By disposing the joint portion 47 in the almost-triangular space 91 formed in a corner above the semicircle shape, the joint portion 47 can be disposed close to the motor case 49 while avoiding interference with the motor case 49.

A terminal portion lid 92 is attached to an upper portion of the motor case 49. Terminal portions can be observed by removing the terminal portion lid 92.

Figure 7:
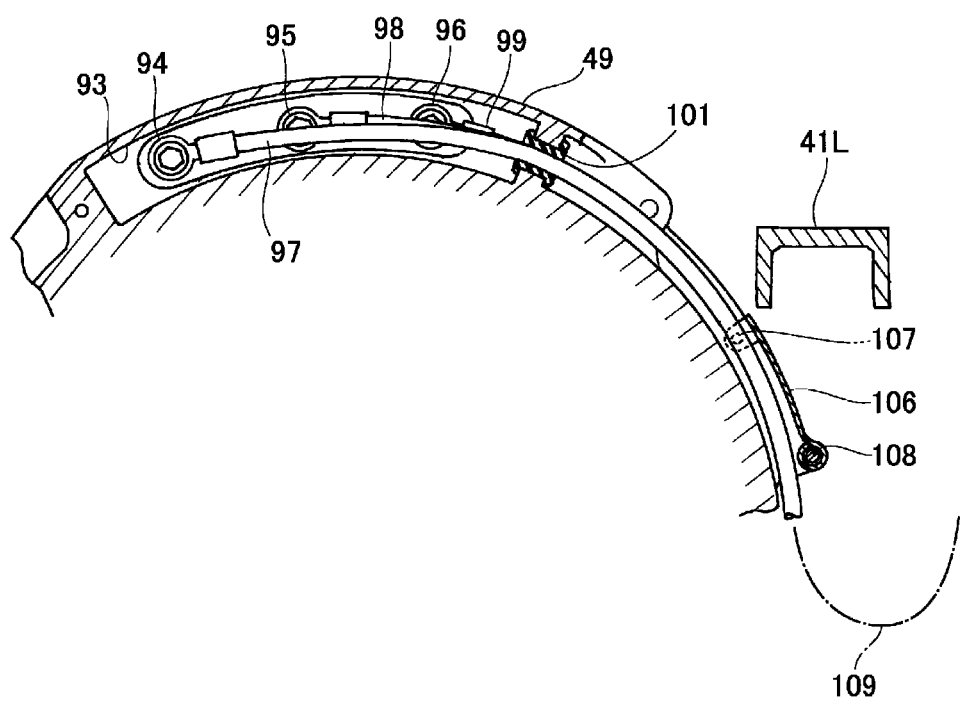
FIG. 7 is a front view of terminal portions.

As shown in FIG. 7, a terminal housing chamber 93 is provided in the upper portion of the motor case 49. In the terminal housing chamber 93, three terminal portions 94 to 96 of U, V, and W are arranged along an outer periphery of the motor case 49 at certain intervals and high-voltage wires 97 to 99 are lead out toward the rear of the vehicle. A grommet 101 is fitted to a penetrating portion of the high-voltage wires 97 to 99 and a waterproof performance of the terminal housing chamber 93 is thereby maintained.

Figure 8:
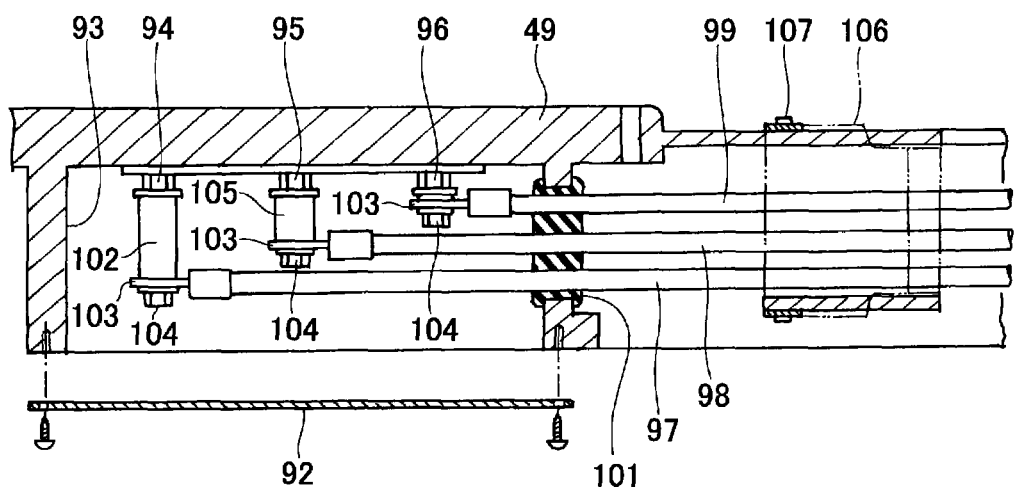
FIG. 8 is a plan view of the terminal portions.

As shown in FIG. 8, the terminal portion 96 on the vehicle rear side in a vehicle plan view is disposed to be offset toward the vehicle body center with respect to the terminal portion 95 in the middle while the terminal portion 94 on the vehicle front side is disposed to be offset toward the wheel with respect to the terminal portion 95 in the middle.

In the terminal portion 94 on the vehicle front side, a crimp terminal 103 is fixed thereto with a bolt 104 via a long socket 102.

In the terminal portion 95 in the middle, the crimp terminal 103 is fixed thereto with the bolt 104 via a socket 105 having a length which is half the length of the socket 102.

In the terminal portion 96 on the vehicle rear side, the crimp terminal 103 is directly fixed thereto with the bolt 104.

In other words, the three terminal portions 94 to 96 are arranged stepwise. Since the terminal portions 94 to 96 are arranged stepwise, end portions of the high-voltage wires 97 to 99 can be fastened to the terminal portions 94 to 96 in straight shapes, without being bent. Connection work of the high-voltage wires 97 to 99 is thereby made easy.

Figure 9:
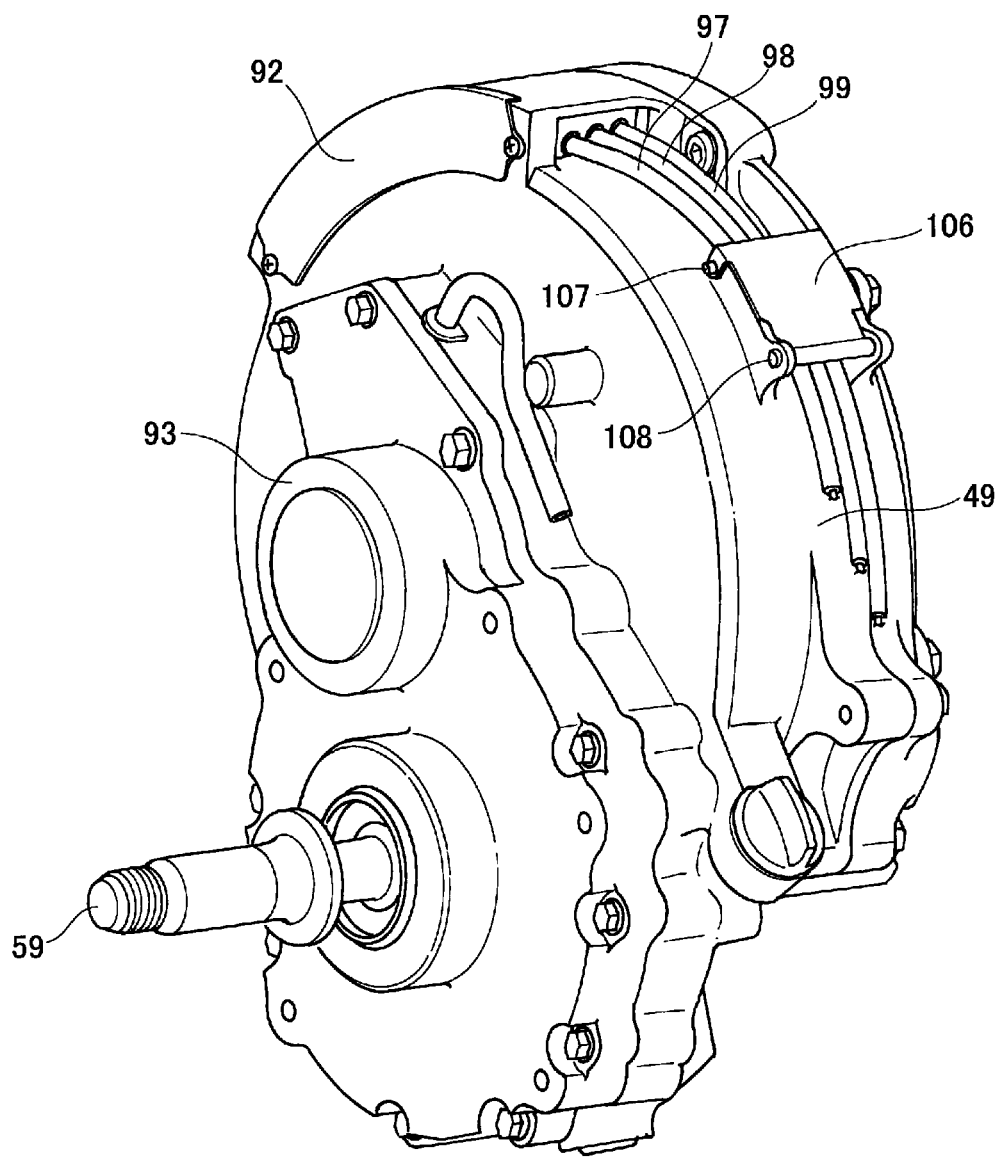
FIG. 9 is a perspective view of the drive unit.

As shown in FIG. 9, the three high-voltage wires 97 to 99 are routed along the outer peripheral surface of the motor case 49.

In addition, the motor case 49 is provided with a cover 106 which covers and holds down the high-voltage wires 97 to 99.

The cover 106 is turnably fastened to the motor case 49 with a hinge pin 107 and an end thereof is fixed to the motor case 49 with a through pin 108. In other words, routing is made easy by opening (erecting) the cover 106 during the routing. The cover 106 is closed after the routing.

As shown in FIG. 7, the cover 106 is provided at a portion where the high-voltage wires 97 to 99 intersect the upper arm 41L. The high-voltage wires 97 to 99 can be fastened to the motor case 49 by the cover 106. In addition, since the high-voltage wires 97 to 99 are protected by the cover 106, the positioning accuracy of the high-voltage wires 97 to 99 is improved. Accordingly, positional relationships of the high-voltage wires with other parts (the upper arm 41L, for example) can be accurately determined.

Moreover, the high-voltage wires 97 to 99 extend from vehicle-mounted batteries (reference numerals 112, 113 in FIG. 12) to the terminal portions 94 to 96. Basically, the vehicle-mounted batteries do not vertically move. However, the terminal portions 94 to 96 vertically move together with the motor case 49.

To absorb the vertical movements, it is effective to cause the high-voltage wires 97 to 99 to sag in a U-shape in the middle as shown by an imaginary line. A U-shaped portion 109 can be easily formed in the middle of the high-voltage wires 97 to 99 by causing the lead out portions of the high-voltage wires 97 to 99 to gently curve from a horizontal direction to a downward direction along the outer periphery of the motor case 49 as in the embodiment. Even when the terminal portions 94 to 96 vertically move, there is no worry of the high-voltage wires 97 to 99 becoming loose because the high-voltage wires 97 to 99 extend along the motor case 49 and also because the holding effect is provided by the cover 106.

Next, description is given of batteries which are energy sources of the electric vehicle.

As shown in FIG. 10, box-shaped first battery 112 and second battery 113 are attached to a beam-shaped battery tray 111.

An interface box 114 is mounted on the second battery 113. There is no problem in placing two DC-AC convertors 115L, 115R on the battery tray 111 side by side in the vehicle width direction and placing a controller 116 behind the DC-AC convertor 115L.

Moreover, in the vehicle body frame 11, a rectangular battery housing space 116 is formed by the left and right side sills 23L, 23R, the front cross frame 24, and the rear cross frame 26.

The battery tray 111 with the batteries 112, 113 and the like assembled thereto in advance is attached to the battery housing space 116 from below. Then, a battery cover 118 is attached from below.

Figure 11:
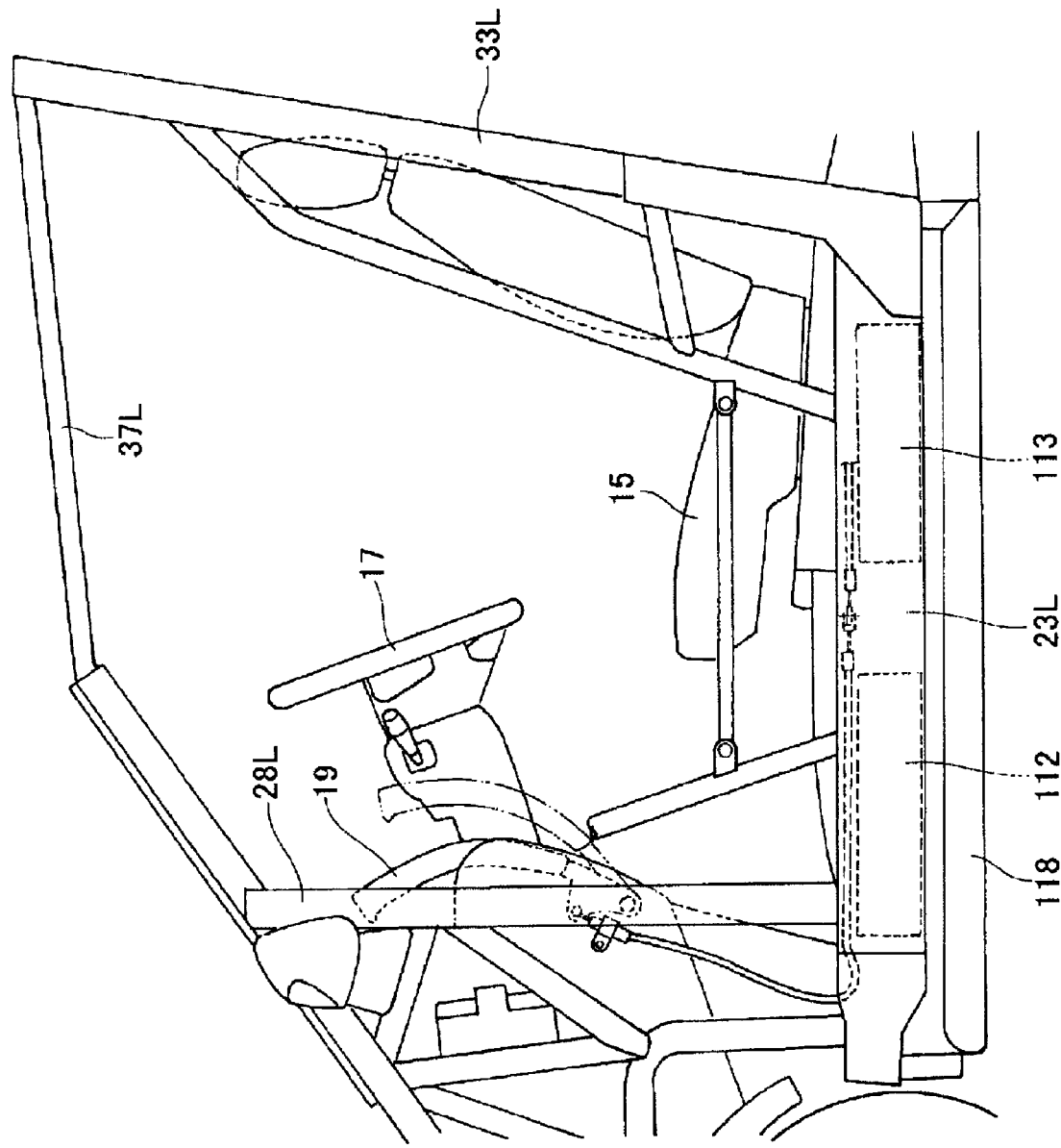
FIG. 11 is a left side view (partial view) of the electric vehicle.

As a result, as shown in FIG. 11, the batteries 112, 113 fit within the height dimension of the side sill 23L.

Figure 12:
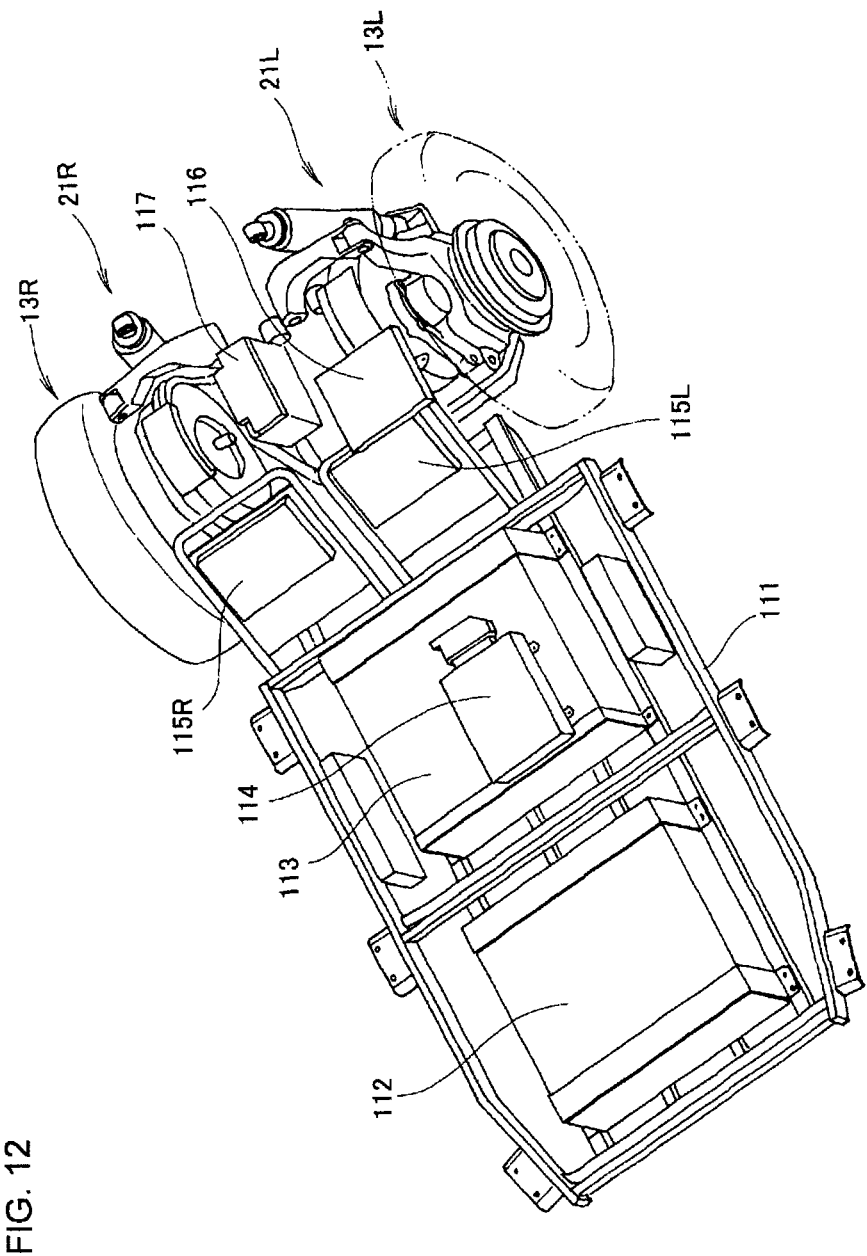
FIG. 12 is a perspective view of the vehicle floor.

As shown in FIG. 12, a 12 V battery 117 is disposed between the left and right rear wheels 13L, 13R. Specifically, the first battery 112, the second battery 113, the DC-AC convertors 115L, 115R, the controller 116, and the 12 V battery 117 are disposed in a plane in this order from the front to the rear of the vehicle, under the floor (reference numeral 14 in FIG. 1).

In the present invention, although the rear wheels are the drive wheels, the front wheels may be the drive wheels.

The present invention is preferably applied to a narrow four-wheel vehicle in which a driver seat and a passenger seat are arranged one behind the other.

EXPLANATION OF THE REFERENCE NUMERALS

10 ELECTRIC VEHICLE
11 VEHICLE BODY FRAME
13L, 13R DRIVE WHEEL (REAR WHEEL)
41L, 41R UPPER ARM
42L, 42R LOWER ARM
43L, 43R KNUCKLE
45 VEHICLE BODY FRAME SIDE CONNECTION PORTION
47 JOINT PORTION
48 UPPER ARM PORTION
49 MOTOR CASE
54 DRIVE UNIT
59 OUTPUT SHAFT
62 WHEEL
62a RECESSED PORTION OF WHEEL
65 TIRE
66 CENTER CASE
67 ELECTRIC MOTOR
68 REDUCER
71 STATOR
72 REDUCER CASE
73 MOTOR SHAFT
74 ROTOR
75 THROUGH HOLE
76 DRIVE GEAR
77 DRIVEN GEAR
83 BRAKE DEVICE
84 RECTANGULAR SPACE
85 BEARING SUPPORTING PORTION
87 OUTER DIAMETER CIRCLE
88 HORIZONTAL LINE
89 VERTICAL LINE
90 PERPENDICULAR LINE
91 ALMOST-TRIANGULAR SPACE
94 TO 96 TERMINAL PORTION
97 TO 99 HIGH-VOLTAGE WIRE
106 COVER

The invention claimed is:

1. An electric vehicle, comprising:
left and right drive wheels;
a brake device provided in a recessed portion of a wheel of each of the drive wheels, wherein the wheel of each of the drive wheels is driven by a drive unit;
a vertically-swingable upper arm and a vertically-swingable lower arm extending from a vehicle body frame of the electric vehicle in a vehicle width direction;
a knuckle connected to a distal end of the upper arm and a distal end of the lower arm, wherein the wheel of each of the drive wheels is rotatably supported by the knuckle, and wherein the drive unit is connected to the knuckle from a vehicle body center side,
wherein the drive unit comprises an electric motor and a reducer integrated as a unit,
wherein the electric motor is disposed such that a perpendicular line passing through a rotation center of the wheel of each of the drive wheels overlaps a motor shaft in a vehicle side view, and
wherein an upper arm portion of the knuckle extends obliquely upward toward a rear of the vehicle from the knuckle interposed between the wheel of each of the drive wheels and the drive unit to a position where the upper arm portion does not overlap the drive unit in the vehicle side view, and wherein the upper arm is connected to an upper end of the upper arm portion.

2. An electric vehicle, comprising:
left and right drive wheels;
a brake device provided in a recessed portion of a wheel of each of the drive wheels, wherein the wheel of each of the drive wheels is driven by a drive unit;
a vertically-swingable upper arm and a vertically-swingable lower arm extending from a vehicle body frame of the electric vehicle in a vehicle width direction;
a knuckle connected to a distal end of the upper arm and a distal end of the lower arm, wherein the wheel of each of the drive wheels is rotatably supported by the knuckle, and wherein the drive unit is connected to the knuckle from a vehicle body center side,
wherein the drive unit comprises an electric motor and a reducer integrated as a unit,
wherein the electric motor is disposed such that a perpendicular line passing through a rotation center of the wheel of each of the drive wheels overlaps a motor shaft in a vehicle side view,
wherein an upper arm portion extends obliquely upward toward a rear of the vehicle from the knuckle interposed between the wheel of each of the drive wheels and the drive unit to a position where the upper arm portion does not overlap the drive unit in the vehicle side view, and wherein the upper arm is connected to an upper end of the upper arm portion,
wherein the drive unit comprises the electric motor being attached to one surface of a center case and the reducer being attached to another surface of the center case,
wherein the electric motor includes a bottomed-tube-shaped motor case fastened to the center case, a stator attached to the motor case, the motor shaft rotatably supported at one end by the motor case and rotatably supported at another end by a reducer case, and a rotor attached to the motor shaft and surrounded by the stator,
wherein the center case has a through hole through which the motor shaft penetrates,
wherein the reducer includes the bottomed-tube-shaped reducer case fastened to the center case, a drive gear provided at a front end of the motor shaft and housed in the reducer case, a driven gear rotated by the drive gear directly or via an intermediate gear and housed in the reducer case, and an output shaft rotated by the driven gear and rotating the wheel of each of the drive wheels, and
wherein a bearing supporting portion supporting another end of the motor shaft is provided in the reducer case and protrudes to the recessed portion of the wheel while extending at a lateral side of the knuckle.

3. The electric vehicle according to claim 2, wherein the drive unit is disposed inside an outer diameter circle of a tire of each of the drive wheels in a vehicle side view.

4. The electric vehicle according to claim 3, wherein a rectangular space surrounded from three sides by the tire, the reducer case, and the center case in a vehicle front view is formed and a joint portion between the upper arm portion and the upper arm is disposed in the rectangular space.

5. The electric vehicle according to claim 4, wherein, in the vehicle side view, an upper half of the motor case has a semicircle shape and at least part of the joint portion is disposed in an almost-triangular space surrounded by the semicircle, a horizontal line passing through an uppermost point of the semicircle, and a vertical line passing through the vehicle rearmost point of the semicircle.

6. The electric vehicle according to claim 5, wherein the upper arm comprises a V-shaped member having an intermediate portion protruding upward and a vehicle body frame side connection portion of the upper arm is below the joint portion.

7. The electric vehicle according to claim 5, further comprising a terminal portion is provided in an upper portion of the motor case, and a high-voltage wire extending from the terminal portion and routed along an outer peripheral surface of the motor case.

8. The electric vehicle according to claim 7, wherein the terminal portion includes three terminal portions for U, V, and W, respectively, the three terminal portions being disposed along the outer peripheral surface of the motor case at certain intervals, wherein the high-voltage wire is lead out toward the rear of the vehicle, and wherein a first terminal portion of the three terminal portion on a vehicle rear side in a vehicle plan view is disposed to be offset toward a vehicle body center with respect to a second terminal portion in the middle, and a third terminal portion on a vehicle front side is disposed to be offset toward the wheel with respect to the second terminal portion in the middle.

9. The electric vehicle according to claim 7, further comprising a cover configured to cover and hold down the high-voltage wire, the cover being disposed in a portion of the motor case where the high-voltage wire intersects the upper arm.

10. An electric vehicle, comprising:
left and right drive wheel means for driving the electric vehicle;
brake means disposed in a recessed portion of each of the drive wheel means, wherein each of the drive wheel means is driven by a drive means for providing motive power;
upper arm means and lower arm means for vertically swinging from a vehicle body frame of the vehicle in a vehicle width direction;
knuckle means for rotatably supporting the wheel of each of the drive wheel means, said knuckle means being connected to a distal end of the upper arm means and a distal end of the lower arm means, wherein the drive means is connected to the knuckle means from a vehicle body center side,
wherein the drive means comprises an integrated electric motor means for providing rotational force and a reducer means for reducing the output of the electric motor means, wherein the electric motor means is disposed such that a perpendicular line passing through a rotation center of the wheel of each of the drive wheel means overlaps a motor shaft in a vehicle side view, and
wherein an upper arm portion of the knuckle means extends obliquely upward toward a rear of the vehicle from the knuckle means interposed between the wheel of each of the drive wheel means and the drive means to a position where the upper arm portion does not overlap the drive means in the vehicle side view, and wherein the upper arm means is connected to an upper end of the upper arm portion.

11. An electric vehicle, comprising:
left and right drive wheel means for driving the electric vehicle;
brake means disposed in a recessed portion of each of the drive wheel means, wherein each of the drive wheel means is driven by a drive means for providing motive power;

upper arm means and lower arm means for vertically swinging from a vehicle body frame of the vehicle in a vehicle width direction;

knuckle means for rotatably supporting the wheel of each of the drive wheel means, said knuckle means being connected to a distal end of the upper arm means and a distal end of the lower arm means, wherein the drive means is connected to the knuckle means from a vehicle body center side, wherein the drive means comprises an integrated electric motor means for providing rotational force and a reducer means for reducing the output of the electric motor means, wherein the electric motor means is disposed such that a perpendicular line passing through a rotation center of the wheel of each of the drive wheel means overlaps a motor shaft in a vehicle side view, wherein an upper arm portion extends obliquely upward toward a rear of the vehicle from the knuckle means interposed between the wheel of each of the drive wheel means and the drive means to a position where the upper arm portion does not overlap the drive means in the vehicle side view, and wherein the upper arm means is connected to an upper end of the upper arm portion, wherein the drive means comprises the electric motor means being attached to one surface of a center case and the reducer means being attached to another surface of the center case, wherein the electric motor means including a bottomed-tube-shaped motor case fastened to the center case, a stator means attached to the motor case, the motor shaft being rotatably supported at one end by the motor case and rotatably supported at another end by a reducer case, and a rotor means attached to the motor shaft and surrounded by the stator means, wherein the center case having a throughhole through which the motor shaft penetrates, wherein the reducer means including the bottomed-tube-shaped reducer case fastened to the center case, a drive gear provided at a front end of the motor shaft and housed in the reducer case, a driven gear rotated by the drive gear directly or via an intermediate gear and housed in the reducer case, and an output shaft rotated by the driven gear and rotating the wheel of each of the drive wheels, and wherein bearing supporting means are provided for supporting another end of the motor shaft in the reducer case and protruding to the recessed portion of the wheel while extending at a lateral side of the knuckle means.

12. The electric vehicle according to claim 11, wherein the drive means is disposed inside an outer diameter circle of a tire of each of the drive wheel means in a vehicle side view.

13. The electric vehicle according to claim 12, wherein the tire, the reducer case, and the center case forms a rectangular space surrounded on three sides in a vehicle front view, and wherein a joint portion is formed between the upper arm portion and the upper arm means.

14. The electric vehicle according to claim 13, wherein, in the vehicle side view, an upper half of the motor case has a semicircle shape and at least part of the joint portion is disposed in an almost-triangular space surrounded by the semicircle, a horizontal line passing through an upper most point of the semicircle, and a vertical line passing through a vehicle rear most point of the semicircle.

15. The electric vehicle according to claim 14, wherein the upper arm means comprises a V-shaped member having an intermediate portion protruding upward and a vehicle body frame side connection portion of the upper arm means is below the joint portion.

16. The electric vehicle according to claim 14, further comprising terminal means disposed in an upper portion of the motor case, said terminal means for completing wiring connections, and a high voltage wire extending from the terminal means routed along an outer peripheral surface of the motor case.

17. The electric vehicle according to claim 16, wherein the terminal means comprises three terminals for U, V, and W, respectively, the three terminals being disposed along the outer peripheral surface of the motor case at certain intervals, wherein the high voltage wire is lead out toward the rear of the vehicle, and wherein a first terminal of the three terminals on a vehicle rear side in a vehicle plan view is disposed to be offset toward a vehicle body center with respect to a second terminal in the middle, and a third terminal on a vehicle front side is disposed to be offset toward the wheel with respect to the second terminal in the middle.

18. The electric vehicle according to claim 16, further comprising cover means for covering and holding down the high-voltage wire, the cover means being disposed in a portion of the motor case where the high voltage wire intersects the upper arm means.

* * * * *